United States Patent [19]
Underwood et al.

[11] 3,877,671
[45] Apr. 15, 1975

[54] UNITARY TIE-DOWN PANEL APPARATUS

[75] Inventors: Paul Underwood, Garden Grove; Edwin F. Barranger, Huntington, both of Calif.

[73] Assignee: Hughes Aircraft Company, Culver City, Calif.

[22] Filed: Jan. 16, 1974

[21] Appl. No.: 435,152

Related U.S. Application Data

[63] Continuation of Ser. No. 232,136, March 6, 1972, abandoned.

[52] U.S. Cl.................................. 248/346; 248/499
[51] Int. Cl............................................. B61d 45/00
[58] Field of Search............ 248/361 R, 361 A, 346

[56] References Cited
UNITED STATES PATENTS

| | | | |
|---|---|---|---|
| 2,142,305 | 1/1939 | Davis | 52/589 |
| 2,336,235 | 12/1943 | Fischer | 52/593 |
| 2,753,018 | 7/1956 | Curell | 52/588 |
| 3,353,780 | 11/1967 | Young | 248/361 |
| 3,478,995 | 11/1969 | Lautzenhiser et al. | 248/361 A |
| 3,497,213 | 2/1970 | Stanwood | 52/579 |

Primary Examiner—Roy D. Frazier
Assistant Examiner—Robert W. Gibson, Jr.
Attorney, Agent, or Firm—W. H. MacAllister, Jr.; Lewis B. Sternfels

[57] ABSTRACT

The tie-down panel apparatus comprises one or more unitary, preferably extruded panel elements each having a structurally uniting tie-down channel integral to and running lengthwise of the panel element and having side sections parallel with the tie-down channel and mateable with other panel elements to provide a vertical self-aligning mechanical interlock. Two or more extruded panel elements can be bonded together at their mating end sections with a structural epoxy adhesive or angle members, thus permitting the user to fabricate any width of panel. Since the panel elements are of a single structure, they can be cut to any desired length, to augment the design flexibility of the panel elements for specific applications. The top surface of each tie-down panel element is covered with a skid and mar resistant, resilient material which has a limited amount of shock and vibration cushioning value. This material is bonded to the top surface of each panel element. Equipment, containers for goods, machinery, etc., are secured to the tie-down apparatus with adjustable straps.

4 Claims, 4 Drawing Figures

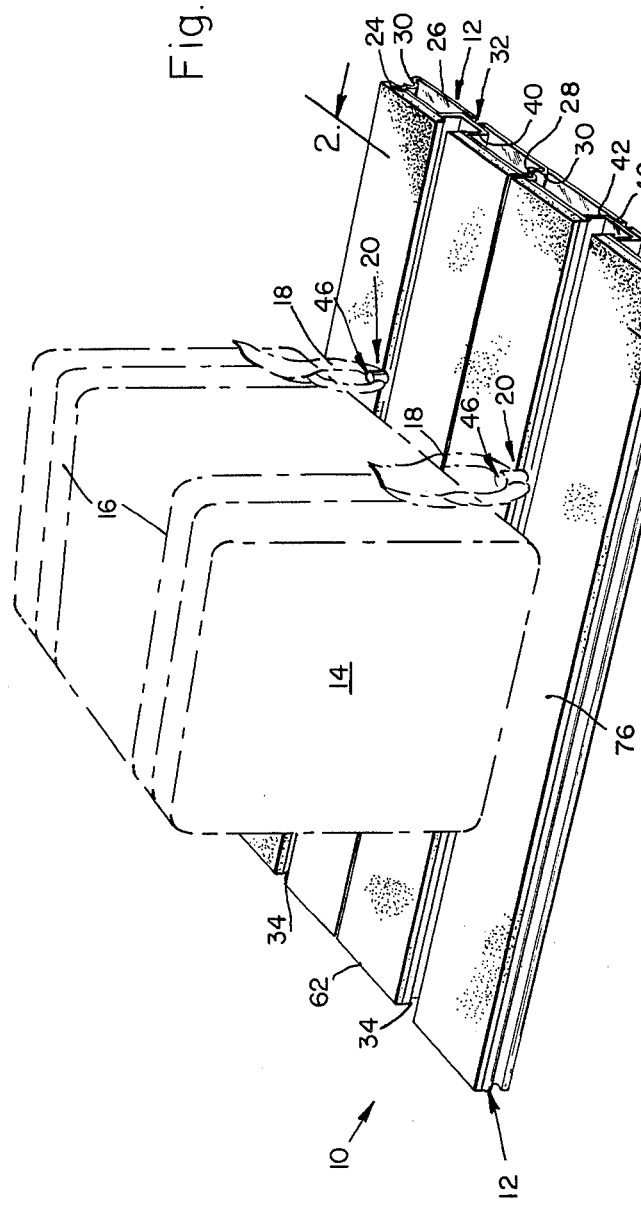
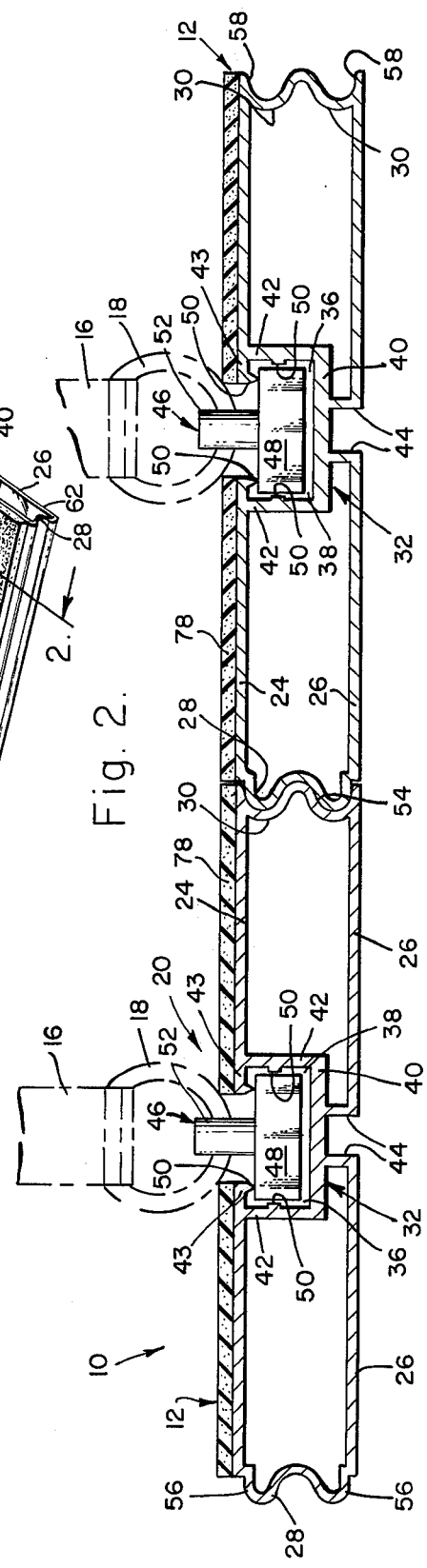

UNITARY TIE-DOWN PANEL APPARATUS

This is a continuation of application Ser. No. 232,136, filed Mar. 6, 1972, now abandoned.

BACKGROUND OF THE INVENTION

The present invention relates to a tie-down apparatus and, in particular, to such an apparatus having a structurally integrating tie-down channel formed in a single panel element capable of interlocking with similar panel elements.

Many equipment carriers, such as trucks, vans, trailers, railway cars, airplanes, and cargo housings, are made mobile so that the equipment carried thereby may be transported easily from site to site as, for example, for purposes of transportation, servicing of outdoor installations and for military operations. At the same time, such carriers must be capable of carrying a variety of equipment which may be easily removed and exchanged with other equipment in order to tailor the use of the carrier to the particular servicing need. To achieve such mobility and exchange of equipment, it is often mandatory both that the carrier be as light as possible and that a minimum of damage occur to the mobile equipment. Therefore, the entire facility which houses and supports such equipment must have maximum strength with minimum weight and must be provided with a means by which the equipment can be securely tied to the carrier yet be easily removed and replaced. While considerable progress has been made to decrease the weight of instrumentation and working parts of the equipment, the means by which such equipment is housed, supported, secured, or transported has not altogether kept pace with the design of the equipment.

There are other cases where equipment must be secured to the structure, such as to walls, floors, ceilings and shelves of a carrier, whether stationary or mobile.

Although one improvement has been made in which the structure comprises honeycomb material and in which the equipment is secured to honeycomb panels, as disclosed in United States Pat. No. 3,478,995, such a honeycomb panel structure is expensive to fabricate and, therefore, becomes less attractive for this reason. Furthermore, it had not been convenient to tailor its dimensions with ease.

SUMMARY OF THE INVENTION

The present invention, therefore, constitutes an improvement over the apparatus disclosed in U.S. Pat. No. 3,478,995 and is directed to an apparatus which is inexpensive, easy to fabricate into desired sizes, and of great strength and low weight for supporting and securing equipment. Briefly, the present invention comprises a unitary, preferably extruded panel element into which a channel is integrally formed to function not only as an attachment for tieing down equipment regardless of the particular shape or size of the equipment, but also as a structural and integrating support. Opposed sides of the panel are formed with cooperative, mating interlocks so that two or more panels may be placed together and bonded at the interlocks and the panels may also be cut to any desired length to suit the intended end uses and required sizes. The panel element may be fabricated from any suitable metal or plastic material or composite, such as aluminum, steel, and plastic or reinforced plastic, e.g., fiber glass.

It is, therefore, an object of the present invention to provide an inexpensive, high strength, low weight tie-down panel.

Another object is the provision of a versatile, building-block type panel apparatus.

Another object is to provide such an apparatus which is capable of being tailored to a desired size.

Another object is the provision of such an apparatus which lends itself to quick and easy securement and removal of equipment and the like.

Other aims and objects, as well as a more complete understanding of the present invention, will appear from the following explanation of an exemplary embodiment and the accompanying drawings thereof, in which:

BRIEF DESCRIPTION OF THE DRAWINGS

FIG. 1 is a perspective view of a tie-down panel apparatus supporting and fixedly securing equipment;

FIG. 2 is a sectional view of the panel apparatus taken along lines 2—2 of FIG. 1;

DESCRIPTION OF THE PREFERRED EMBODIMENTS

Figure 3:
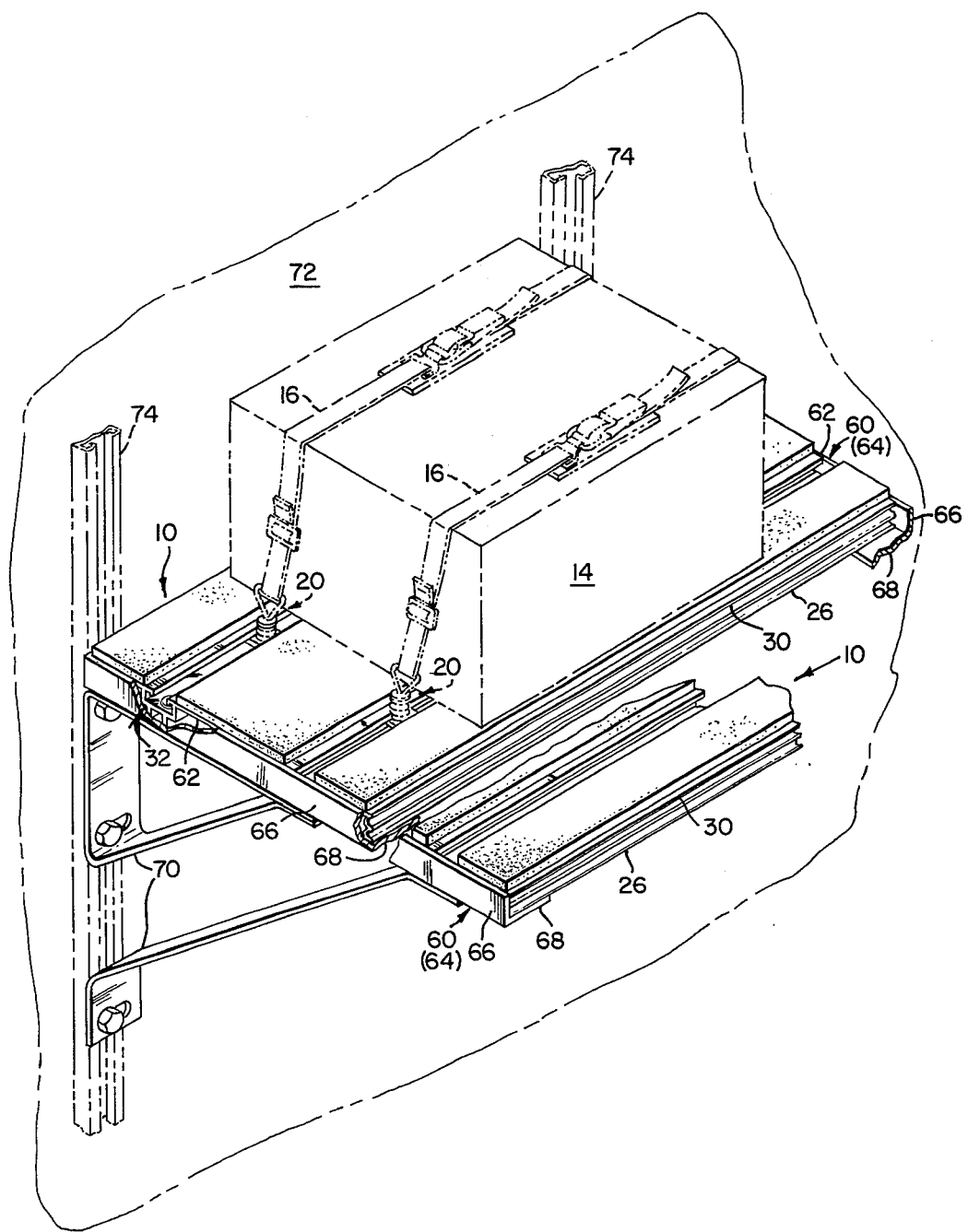
FIG. 3 is a perspective view of the present invention used as a shelf.

Accordingly, a tie-down panel apparatus 10 comprises one or more elements 12 embodied, for example, as a shelf or a section of a shelf, a floor, a ceiling or a wall. An apparatus 14, which may comprise an oscilloscope, a vacuum tube voltmeter, or a container for goods, is securely held onto two panel elements by means of straps 16, attachments 18, and a tie-down mechanism 20. It is to be understood, however, that straps 16 and attachments 18 may take other well-known shapes. The attachments may comprise rings, buckles, etc., as is well-known.

Each panel element 12 comprises a unitary structure including an upper plate 24, a lower plate 26, sides 28 and 30, and a central tie-down section 32, all formed of a single piece of light weight, strong material, such as aluminum, steel and plastic or reinforced plastic. Preferably, the element is extruded, although its component parts may be welded or otherwise bonded together. An elongated slot 34 is formed lengthwise in upper plate 24 to provide an opening 36 for reception of tie-down mechanism 20. The slots open into central section 32 which is configured as a U-shaped channel 38 having a bottom wall 40 and side walls 42 which extend into and become a part of upper plate 24. Thus, upper plate 24 at section 32 becomes top walls or lips 43 for the U-shaped channel. Bottom wall 40 is secured to lower plate 26 by integral segments 44, although it is to be understood that side walls 42 may be attached directly to the lower plate. Side walls 42 are angled from the bottom wall and extend to and, as stated above, are integral with upper plate 24. Top walls 43 are angled with respect to the side walls and extend toward each other to form opening 36. Therefore, maximum strength and rigidity is provided by an integral unitary construction between bottom wall 40 and lower plate 26 and between side walls 42 and upper plate 24.

A nut 46 is disposable within channel 38 to provide a securing means between attachments 18 and panel element 12. Each nut comprises a base 48 which has a width greater than that of the opening in the top plate so that base 48 of nut 46 lies between bottom wall 40 and top walls 43 of channel 38. Guides 50 in the interior of section 32 facilitate support of the nut. An extension 52 is affixed to base 48 and extends through opening 36 so that attachments 18 may be secured thereto.

Ends 28 and 30 each comprise a Σ-shaped configuration which are mateable as shown at 54 to enable alignment of two mating panel elements and to provide a vertical interlock. End 28 is provided with shelves 56 in upper and lower plates 24 and 26 while end 30 extends into lips 58 of upper and lower plates 24 and 26 which interengage with each other to provide a smooth fitting between respective upper and lower plates of mating panels. A bond, such as of an epoxy resin, may be used to affix the two panels into an integral unit.

One or more panel elements are cut to the length required for their end use and a pair of end caps 60 (see FIG. 3) are secured or otherwise attached to the cut ends 62 of the panel elements. The caps may be of a simple snap-in construction for frictionally engaging the interior of each panel element. When two or more elements are placed together, caps 60 are useable to secure the elements together alone or in combination with the bond at 54.

As shown in FIG. 3, the latter cap comprises an angle member 64 having a side portion 66 and a bottom portion 68. The bottom portion is provided with openings so that bolts securing brackets 70 to the elements also secure angle member 64 to bottom plate 26 of each panel element. Thus, the panel elements are further integrated and supported by angle members 64 as well as protected at their cut ends 62. Brackets 70 are secured to a wall 72 by appropriate supports 74, as is known in the art.

Figure 4:
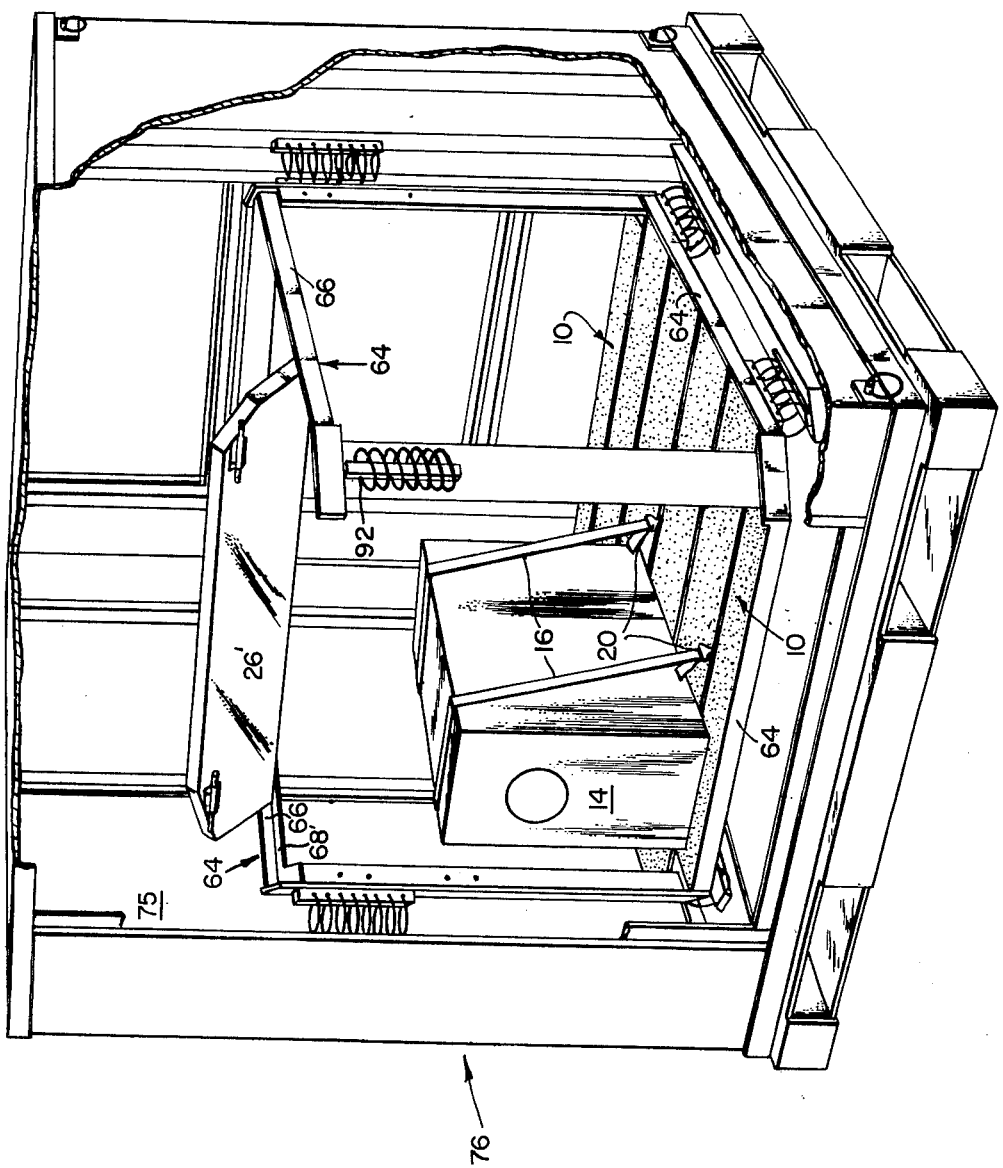
FIG. 4 is a perspective view of the present invention depicting still another view thereof.

When the panel elements abut a wall at their ends 62 or are enclosed (see FIG. 4), angle members 64 are functionable as structural beams wherein side portion 66 is secured to or within the wall 75 and bottom portion 68 is secured to bottom plates 26 of the elements. In this embodiment, it may be preferable to permit side portions 66 to extend downwardly rather than upwardly since the wall closes off element ends 62. Also, as illustrated in FIG. 4, bottom portion 68 may function as a support 68' for the bottom plate 26' of a hinged element. In this embodiment, panel elements are used in an equipment transporter and storage module 76.

The panel is finished with a skid and mar resistant material 78 which is also resilient to provide a limited amount of shock and vibration cushioning value so that apparatus 14, in conjunction with straps 16, attachments 18 and tie-down mechanism 20, will be frictionally and resiliently held on panel apparatus 10. Material 78 is adhered to top section 24 by any suitable means. After the panel elements are cut to their desired lengths, caps 60 are secured to ends 62 of panel apparatus 10 in order to provide the panel with a finished appearance and/or structural support and integrity.

Although the invention has been described with reference to a particular embodiment thereof, it should be realized that various changes and modifications may be made therein without departing from the spirit and scope of the invention.

What is claimed is:

1. A tie-down panel apparatus comprising:

a plurality of panel elements, each said panel element comprising a unitary, extruded structure including an upper plate having lengthwise opening means therein, a lower plate positioned substantially parallel to said upper plate, side portions at opposed sides of said upper and lower plates integrally secured thereto, and a tie-down section secured to said upper and lower plates positioned between said side portions and at said upper plate opening means, said side portions and said tie-down section being the sole means for integrating said upper and lower plates into a substantially rigid structure;

said side portions having a Σ-shaped configuration to enable interlocking of said plurality of said panel elements, one with the other, to extend the width of said panel elements to a desired width;

each of said panel elements capable of being cut along the length thereof perpendicular to the sides of said elements to enable tailoring of said panel elements to a desired length;

said tie-down section of each of said panel elements comprising a U-shaped channel extending through the length of each of said panel elements and including a bottom wall parallelly positioned with respect to said upper and lower plates, a pair of side walls extending between said bottom wall and said upper and lower plates, said side walls having integral connections to said bottom wall and said upper plate, said upper plate having a pair of portions defining said upper plate opening means and overlapping said U-shaped channel, said connections of said side walls to said upper plate spaced adjacent to said opening means, and a pair of segments secured between said bottom wall and said lower plate; and a tie-down mechanism having means disposed between said upper plate opening means and in said U-shaped channel between said upper plate portions and said bottom wall for securing equipment, containers, and the like to said panel elements.

2. An apparatus as in claim 1 further including bonding means secured to said Σ-shaped side portions for affixing said plurality of said panel elements together.

3. An apparatus as in claim 1 further including a pair of shelf-like portions joining said upper and lower plates to one of said Σ-shaped side portions at one side of each of said panel elements and a pair of lips joining said upper and lower plates to the other of said Σ-shaped side portions at the other side of each of said panel elements, said lips fitting within said shelf-like portions during the interlocking of said plurality of said panel elements to provide smooth, uninterrupted surfaces of said upper and lower plates.

4. An apparatus as in claim 1 further including a skid and mar resistant and resilient material bonded to said upper plate of each of said panel elements to provide shock and vibration cushioning for the equipment, containers, and the like secured to said panel elements.

* * * * *